(12) United States Patent
Borhade

(10) Patent No.: US 11,005,959 B1
(45) Date of Patent: May 11, 2021

(54) SYSTEMS AND METHODS FOR ASYNCHRONOUS PUBLISH-SUBSCRIBE MESSAGING AND ACKNOWLEDGMENTS

(71) Applicant: T-Mobile USA, Inc., Bellevue, WA (US)

(72) Inventor: Varsha Borhade, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/788,742

(22) Filed: Feb. 12, 2020

(51) Int. Cl.
*G06F 15/16* (2006.01)
*G06F 9/54* (2006.01)
*H04L 29/06* (2006.01)
*H04L 29/08* (2006.01)

(52) U.S. Cl.
CPC ........ *H04L 67/26* (2013.01); *G06F 2209/547* (2013.01)

(58) Field of Classification Search
CPC ...................................................... H04L 67/26
USPC .......................................................... 709/217
See application file for complete search history.

(56) References Cited

U.S. PATENT DOCUMENTS

| | | | |
|---|---|---|---|
| 2003/0195946 A1* | 10/2003 | Yang | H04L 45/306 709/219 |
| 2004/0034640 A1* | 2/2004 | Jain | G06F 16/21 |
| 2004/0034664 A1* | 2/2004 | Jain | G06F 16/2365 |
| 2005/0096928 A1* | 5/2005 | Ruggaber | H04L 12/18 709/220 |
| 2006/0149787 A1* | 7/2006 | Surlaker | G06F 9/546 |
| 2007/0101341 A1* | 5/2007 | Downing | G06F 9/544 719/314 |
| 2007/0204275 A1* | 8/2007 | Alshab | H04L 69/324 719/313 |
| 2010/0281491 A1* | 11/2010 | Surlaker | G06F 9/546 719/314 |
| 2011/0055339 A1* | 3/2011 | Lobban | G06Q 10/107 709/206 |
| 2011/0225229 A1* | 9/2011 | Srivastava | H04L 51/00 709/203 |
| 2012/0059882 A1* | 3/2012 | Stark | H04L 12/66 709/205 |
| 2014/0040389 A1* | 2/2014 | Beardsmore | H04L 12/1859 709/206 |

(Continued)

*Primary Examiner* — Hamza N Algibhah
(74) *Attorney, Agent, or Firm* — Troutman Pepper Hamilton Sanders LLP; James E. Schutz; Christopher C. Close, Jr.

(57) ABSTRACT

A publish-subscribe messaging method including: generating a modified first publication message by modifying a first publication message to include a reply-to property that directs a recipient device to acknowledge, to an acknowledgment queue, receipt of the first publication message; publishing the modified first publication message to (i) the acknowledgment queue and (ii) a consumer queue; responsive to the modified first publication message being consumed by one or more subscribers and/or a first timeout for the modified first publication message expiring, deleting the modified first publication message from the consumer queue; and responsive to the acknowledgment queue receiving an acknowledgment for the modified first publication message and/or a second timeout for the modified first publication message expiring, deleting the modified first publication message from the acknowledgment queue.

20 Claims, 7 Drawing Sheets

(56) References Cited

U.S. PATENT DOCUMENTS

| | | | |
|---|---|---|---|
| 2014/0269509 A1* | 9/2014 | Ramachandran | H04L 67/24 370/328 |
| 2015/0088782 A1* | 3/2015 | Zhang | G06Q 30/0281 705/346 |

* cited by examiner

SYSTEMS AND METHODS FOR ASYNCHRONOUS PUBLISH-SUBSCRIBE MESSAGING AND ACKNOWLEDGMENTS

FIELD

Examples of the present disclosure relate generally to network messaging and, more particularly, to systems and methods of utilizing asynchronous acknowledgment with publish-subscription messaging models.

BACKGROUND

In networked systems, various messaging patterns can be used so that two different parts of a system connect and communicate with each other. Request-reply is one of the basic messaging patterns wherein the first computer sends a request for some data and the second responds to the request. In such messaging patterns, there usually is a series of such interchanges until the complete message is sent. For example, when the response payload is split into a plurality of messages, an initial request can be sent followed by a series of responses and finally an acknowledgment. The request-reply pattern is straight-forward but has limited scalability.

Accordingly, one alternative is a publish-subscribe model. With publish-subscribe, message senders, called publishers, do not send messages directly to specific receivers (i.e., subscribers), but instead categorize published messages into classes without any foreknowledge of whether there will be any subscribers to the classes. Similarly, subscribers may express interest in one or more classes and only receive messages that are of interest without knowledge of whether any publishers publish messages to those classes. Publishers can publish messages to a message broker, which in turn forwards the message to the subscribers. Publish-subscribe models often are used with streaming, for example, as they can provide greater network scalability and a more dynamic network topology as compared to the request-reply model. But when the message broker uses acknowledgments, performance can suffer because every subscriber thread is held up for the subscriber's activity to complete and an acknowledgment to be provided. In other words, by awaiting acknowledgments from numerous subscribers, message sending rates may be reduced. As message sending rates are reduced, a backlog of messages builds up, leading to memory scarcity and, potentially, out-of-memory scenarios.

Accordingly, there is a need for systems and methods for improved messaging characteristics. More specifically, a need exists for an asynchronous publish-subscribe messaging model with acknowledgments. Moreover, there is a need for systems and methods for guaranteed, exactly-once delivery. Aspects of the present disclosure are related to these and other concerns.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As discussed above, publish-subscription messaging models have various benefits over a direct request-reply model. But the related art's acknowledgments delay message delivery, thus negatively affecting service. Therefore, it is desirable to have an improved acknowledgment mechanism that enhances message delivery with publish-subscribe messaging. In some examples of the present disclosure, destination clients (i.e., subscribers) send acknowledgments for messages in different channels from which the messages are received. Accordingly, the publication thread is not required to await acknowledgments. In embodiments, the messaging service includes a "reply to" property that instructs subscribers to reply to a different channel. The messaging service both publishes the message to publication/subscribe queue, and copies the message to an acknowledgment queue. Publish-subscribe messaging can be achieved using a microservice architecture, which can be scaled independently for improved performance.

Reference will now be made in detail to aspects of the disclosed technology, examples of which are illustrated in the accompanying drawings and disclosed herein. Wherever convenient, the same reference numbers will be used throughout the drawings to refer to the same or like parts.

Figure 1:
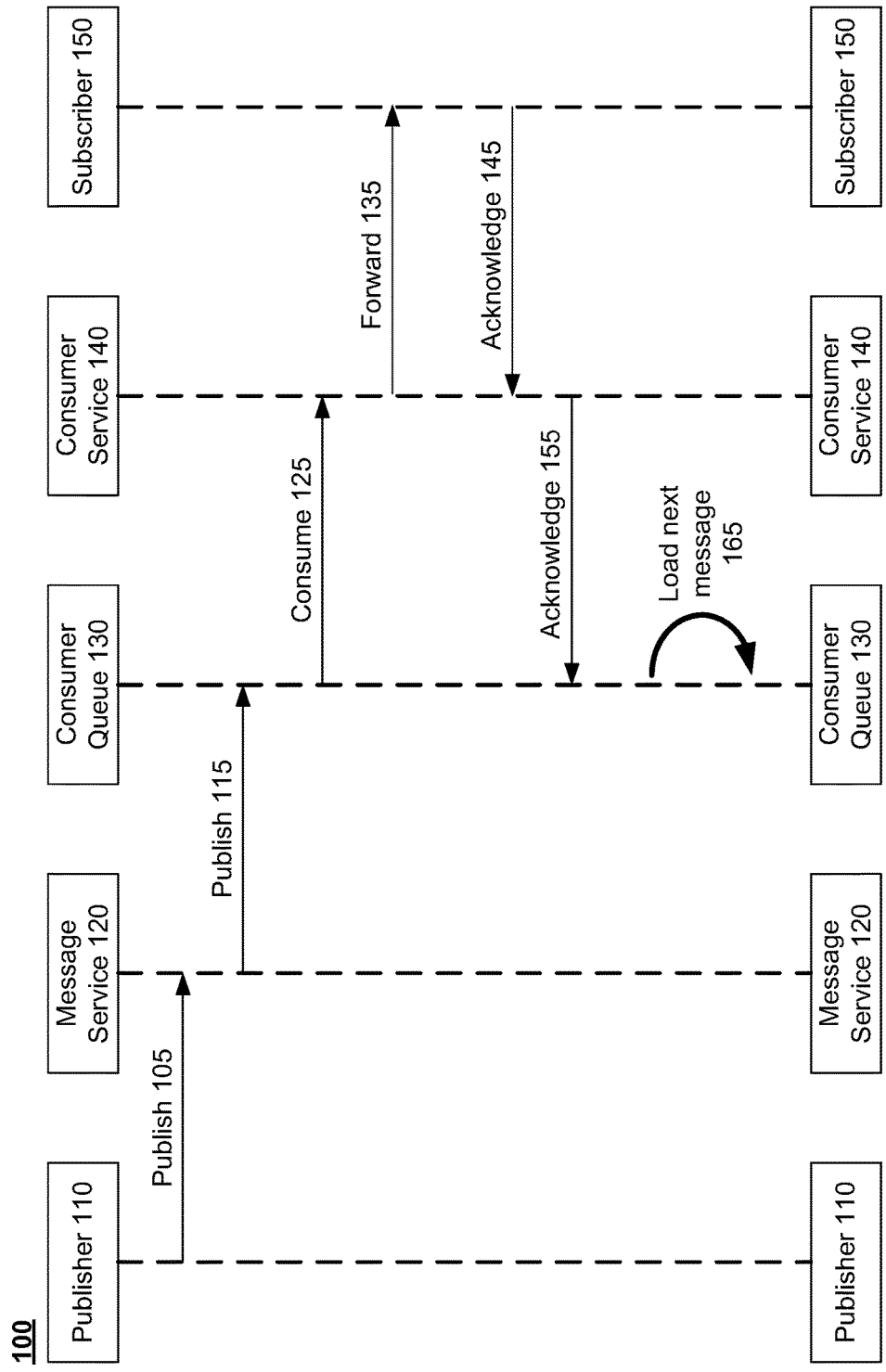
FIG. 1 is a timing diagram of a publish-subscribe message flow in the related art.

As shown in FIG. 1, timing diagram 100 illustrates an example of publication-subscribe messaging with acknowledgment according to the related art. The components and arrangements shown in FIG. 1 are not intended to limit the disclosed embodiments as these components and features can vary. In FIG. 1, at 105, publisher 110 (e.g., a publisher client) publishes a message to message service 120 (e.g., a publisher service). At 115, message service 120 publishes the message to publication queue 130 (i.e., a consumer queue). At 125, consumer service 140 consumes the message from publication queue 130. Then, at 135, consumer service 140 forwards the message to subscriber 150 (e.g., a user equipment (UE) or an external service).

Once subscriber 150 receives the message, at 145, subscriber 150 sends an acknowledgment to consumer service 140. Then, at 155, consumer service 140 forwards an acknowledgment to consumer queue 130, and consumer queue 130 can load a next message to the front of the queue at 165 (e.g., delete the current message). From the message being consumed at 125 until receiving the acknowledgment at 155, consumer queue 130 is open, but busy waiting for consumer service 140 to respond. When waiting for a plurality of consumer services 140, consumer queue 130 may be busy for an extended period of time awaiting a plurality of acknowledgments. If even a single acknowledgement is delayed, a next message may not be published in consumer queue 130 (e.g., publication queue 130) for an extended period of time. Table 1, below shows example messages within the timing diagram 100.

TABLE 1

| Message Description | Example Message |
|---|---|
| Publisher 110 to Message Service 120 | { "timeoutWindow":"60", "queueName":"edsp-prepaid-data", "payload": {"key1":"value2","key2":"val2"}} |
| Message Service 120 to Consumer Queue 130 | { "timeoutWindow":"60", "timestamp":"09/05/2017 08:01:16", "retryCount":0, "queueName":"edsp-prepaid-data", "payload": {"key1":"value2","key2":"val2"}} |
| Consumer Queue 130 to Consumer Service 140 | { "timeoutWindow":"60", "timestamp":"09/05/2017 08:01:16", "retryCount":0, "queueName":"edsp-prepaid-data", "payload": {"key1":"value2","key2":"val2"}} |
| Consumer Service 140 to Subscriber 150 | { "timeoutWindow":"60", "timestamp":"09/05/2017 08:01:16", "retryCount":0, "queueName":"edsp-prepaid-data", "payload": {"key1":"value2","key2":"val2"}} |
| Subscriber 150 to Consumer Service 140 | { "acknowledge": "messageId"} |
| Consumer Service 140 to Consumer Queue 130 | { "acknowledge": "messageId"} |

Figure 2:
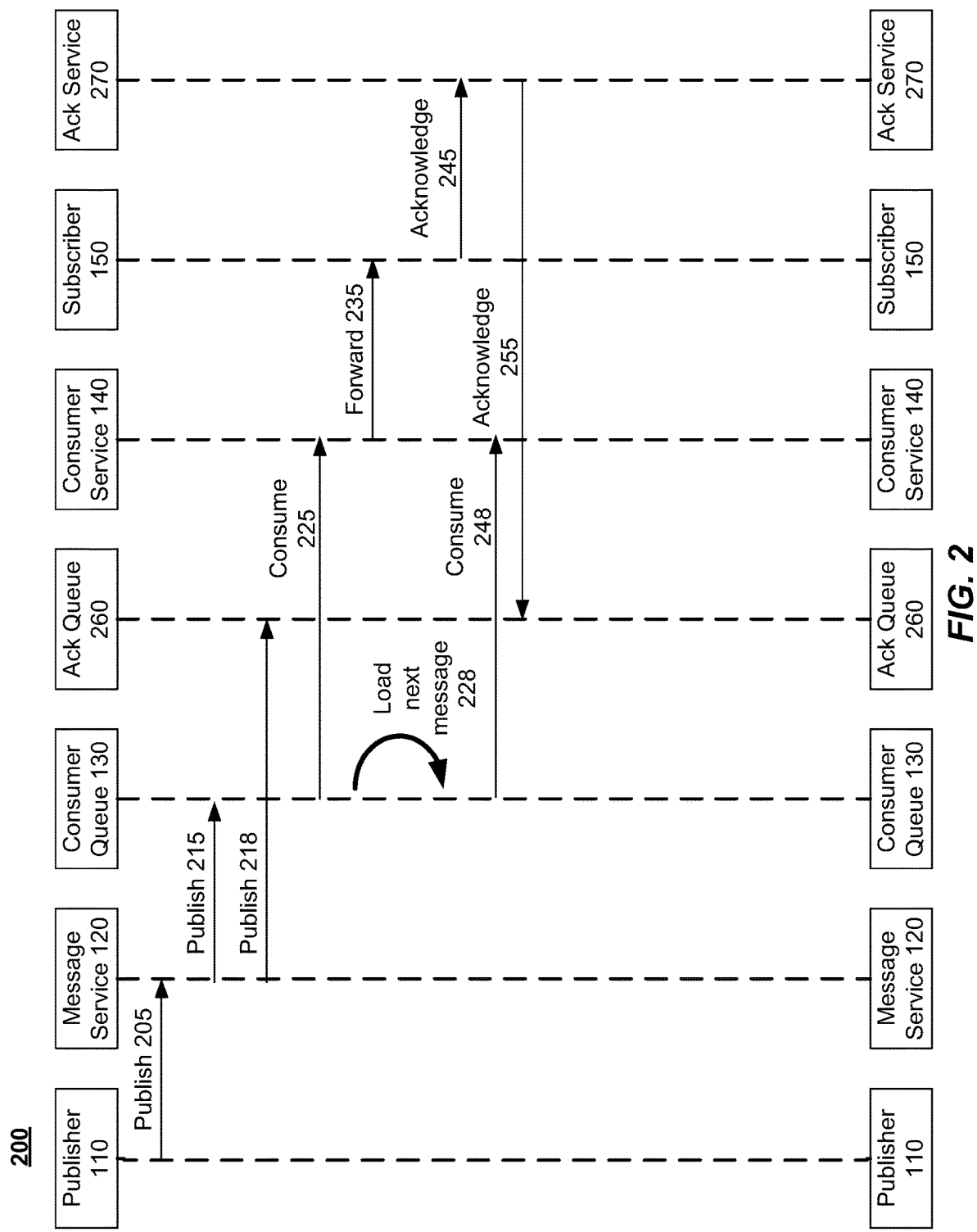
FIGS. 2-4 are timing diagrams of a publish-subscribe message flow illustrating aspects of the present disclosure.

As shown in FIG. 2, timing diagram 200 illustrates an example of publication-subscribe messaging with acknowledgment. The components and arrangements shown in FIG. 2 are not intended to limit the disclosed embodiments as these components and features can vary. In FIG. 2, at 205, publisher 110 (e.g., a publisher client) publishes a message to message service 120 (e.g., a publisher service). At 215, message service 120 publishes the message to publication queue 130 (i.e., a consumer queue). Additionally, at 218, message service 120 publishes the message to an acknowledgment queue 260. Message service 120 can add a "ReplyTo" property to the message prior to adding it to the publication queue 130. The "ReplyTo" property directs (e.g., instructs) the recipient to send an acknowledgment to acknowledgment service 270, as discussed in further detail below. Acknowledgement service 270 may be implemented to respond to a POST API calls (e.g., using REST) from, for example, consumers and process the requests to either clear or resend the message. One of ordinary skill will recognize that "ReplyTo" is newly added property to the message not used heretofore with publish-subscribe services. However, as the publish-subscribe services are flexible, it would be readily within the skill of one of ordinary skill to append this new functionality in light of the present disclosure.

At 225, consumer service 140 consumes the message from publication queue 130. Then, at 235, consumer service 140 forwards the message to subscriber 150 (e.g., an external service). Once subscriber 150 receives the message, at 245, subscriber 150 sends an acknowledgment to acknowledgment service 270. Then, at 255, acknowledgment service 270 forwards an acknowledgment to acknowledgment queue 260. Unlike in timing diagram 100, in timing diagram 200, consumer queue 130 does not need to wait for acknowledgments before loading a next message (e.g., deleting the current message). Rather, once the message is consumed at 225, consumer queue 130 can load a next message at 228, and consumer service 140 can consume the message at 248 before the acknowledgment is even received by acknowledgment queue 260. Thus, even if a plurality of consumer services 140 consume the message from consumer queue 130, consumer queue 130 does not need to wait from acknowledgments from all consumer services 140 before loading a next message. Moreover, if one or more acknowledgements are not received before the message timeout occurs, acknowledgment queue 260 can be queried, and the message reposted to consumer queue 130 and acknowledgment queue 260 with an incremented retry count.

Table 2, below, shows example messages within the timing diagram 200.

TABLE 2

| Message Description | Example Message |
|---|---|
| Publisher 110 to Message Service 120 | { "timeoutWindow":"60", "queueName":"edsp-prepaid-data", "payload": {"key1":"value2","key2":"val2"}} |
| Message Service 120 to Consumer Queue 130 | { "timeoutWindow":"60", "timestamp":"09/05/2017 08:01:16", "ReplyTo":"AckQueue", "retryCount":0 "queueName":"edsp-prepaid-data", "payload": {"key1":"value2","key2":"val2"}} |
| Message Service 120 to Acknowledgement Queue 260 | { "timeoutWindow":"60", "timestamp":"09/05/2017 08:01:16", "ReplyTo":"AckQueue", "retryCount":0 "queueName":"edsp-prepaid-data", "payload": {"key1":"value2","key2":"val2"}} |
| Consumer Queue 130 to Consumer Service 140 | { "timeoutWindow":"60", "timestamp":"09/05/2017 08:01:16", "ReplyTo":"AckQueue", "retryCount":0, "queueName":"edsp-prepaid-data", "payload": {"key1":"value2","key2":"val2"}} |
| Consumer Service 140 to Subscriber 150 | { "timeoutWindow":"60", "timestamp":"09/05/2017 08:01:16", "ReplyTo":"AckQueue", "retryCount":0, "queueName": "edsp-prepaid-data", "payload":{"key1":"value2","key2":"val2"}} |
| Subscriber 150 to Acknowledgment Service 270 | { "acknowledge": "messageId", "ReplyTo:" : "AckQueue"} |
| Acknowledgement Service 270 to Acknowledgment Queue 260 | { "acknowledge": "messageId", "ReplyTo:" : "AckQueue"} |

Figure 3:
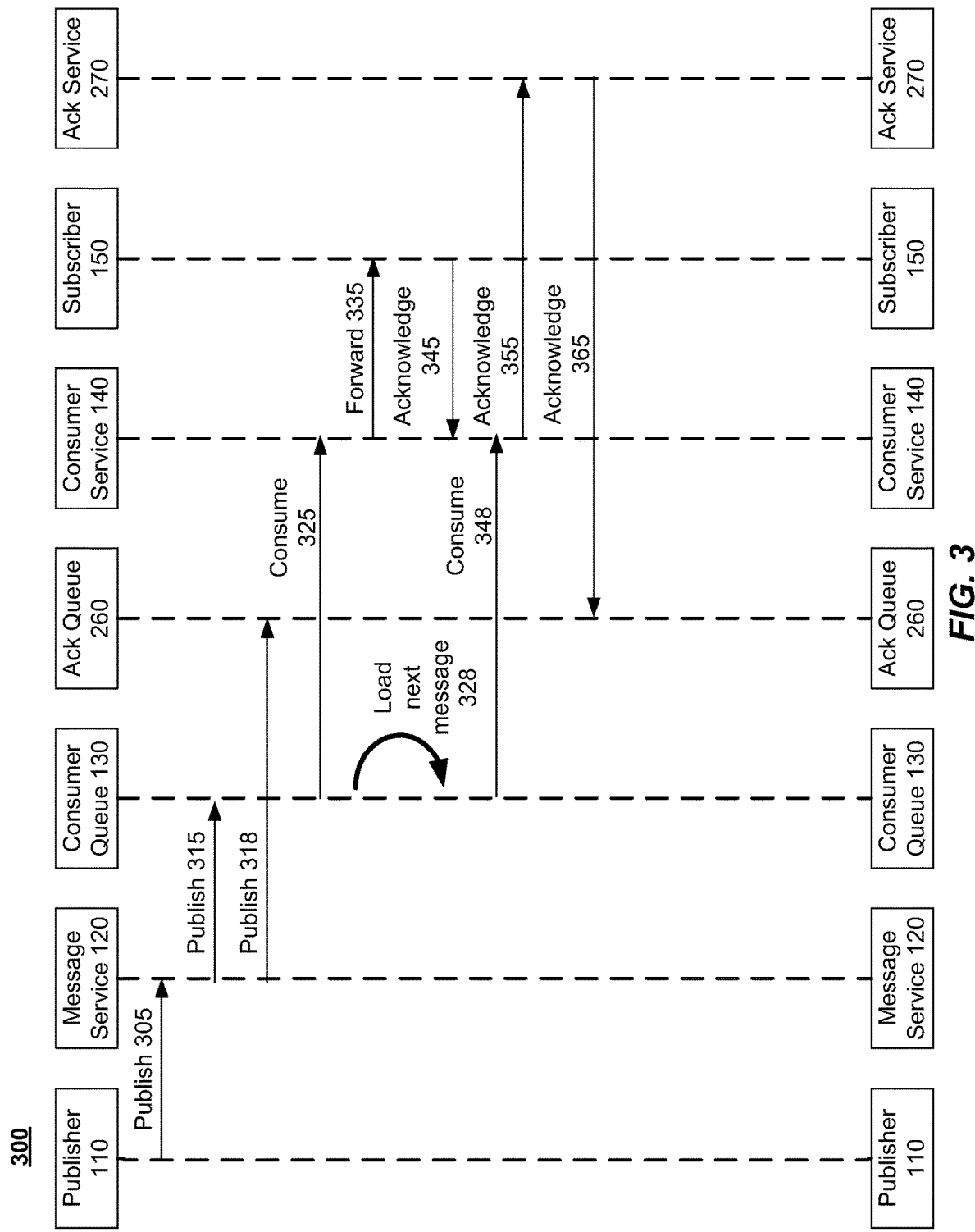

As shown in FIG. 3, timing diagram 300 illustrates an example of publication-subscribe messaging with acknowledgment. The components and arrangements shown in FIG. 3 are not intended to limit the disclosed embodiments as these components and features can vary. As will be understood by one of ordinary skill in light of the disclosure below, the message flow illustrated in timing diagram 300 is substantially similar to the message flow in timing diagram 200 except that subscriber 150 sends the acknowledgment to consumer service 140, which forwards the acknowledgment to acknowledgment service 270.

In FIG. 3, at 305, publisher 110 (e.g., a publisher client) publishes a message to message service 120 (e.g., a publisher service). At 315, message service 120 publishes the message to publication queue 130 (i.e., a consumer queue). Additionally, at 318, message service 120 publishes the message to an acknowledgment queue 260. Message service 120 can add a "ReplyTo" property to the message prior to adding it to the publication queue 130. The "ReplyTo" property instructs consumer service 140 to send an acknowledgment to acknowledgment service 270, as discussed in further detail below.

At 325, consumer service 140 consumes the message from publication queue 130. Then, at 335, consumer service 140 forwards the message to subscriber 150 (e.g., an external service). Once subscriber 150 receives the message, at 345, subscriber 150 sends an acknowledgment to consumer service 140. Then, at 355, consumer service 140 forwards an acknowledgment to acknowledgment service 270, which forwards the acknowledgement to acknowledgment queue 260 at 265. Similar to timing diagram 200, consumer queue 130 does not need to wait for acknowledgements before loading a next message (e.g., deleting the current message). Rather, once the message is consumed at 325, consumer queue 130 can load a next message at 328, and consumer service 140 can consume the message at 348 before the acknowledgment is even received by acknowledgment queue 260. Thus, even if a plurality of consumer services 140 consume the message from consumer queue 130, consumer queue 130 does not need to wait from acknowledgments from all consumer services 140 before loading a next message. The messages sent in timing diagram 300 may be substantially similar to those sent with regards to timing diagram 200, and will not be duplicated for compactness and ease of understanding.

Figure 4:
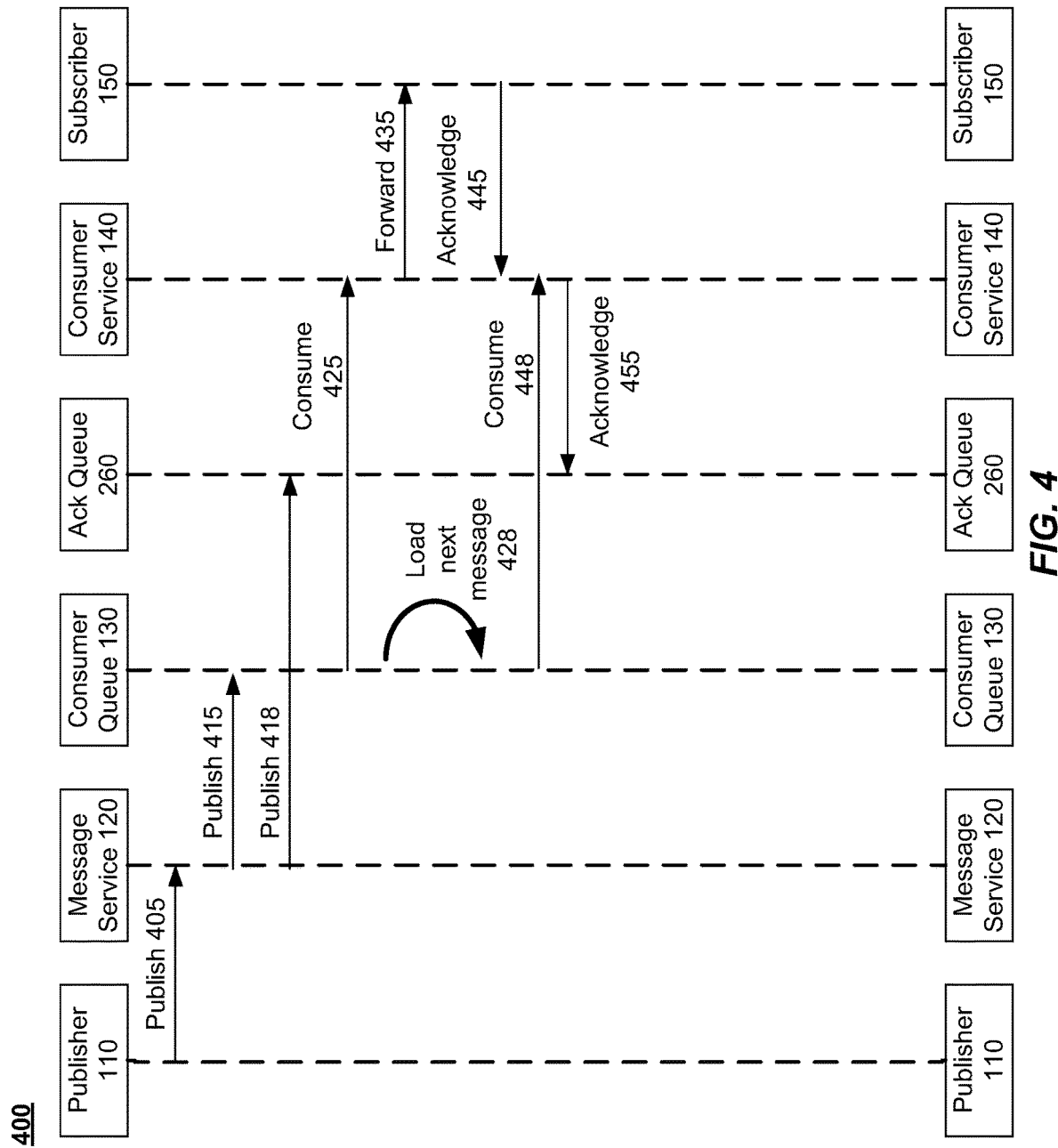

As shown in FIG. 4, timing diagram 400 illustrates an example of publication-subscribe messaging with acknowledgment. The components and arrangements shown in FIG. 4 are not intended to limit the disclosed embodiments as these components and features can vary. As will be understood by one of ordinary skill in light of the disclosure below, the message flow illustrated in timing diagram 400 is similar to the message flow illustrated in timing diagrams 200 and 300 except that subscriber 150 sends the acknowledgement to consumer service 140, which forwards the acknowledgement to acknowledgment queue 260 directly (i.e., without the use of acknowledgement service 270). In an implementation, consumer service 140 can have its own data structure (e.g., a HashMap structure) that keeps track of messages (e.g., based on a message identifiers) and their acknowledgement status. Consumer service 140 can delete entries from this data structure once an acknowledgement has been sent to acknowledgment queue 260. Consumer service 140 could provide individual acknowledgments (e.g., one acknowledgment per message) or batch acknowledgment (e.g., multiple messages per acknowledgment). In some cases, batch acknowledgment may be implemented by sending on acknowledgment that implicitly acknowledges all messages before the current acknowledgement (i.e., in a case where the messages are ordered).

In FIG. 4, at 405, publisher 110 (e.g., a publisher client) publishes a message to message server 120 (e.g., a publisher service). At 415, message service 120 publishes the message to publication queue 130 (i.e., a consumer queue). Additionally, at 418, message service 120 publishes the message to an acknowledgment queue 260. Message service 120 can add a "ReplyTo" property to the message prior to adding it to the publication queue 130. The "ReplyTo" property instructs consumer service 140 to send an acknowledgment to acknowledgment queue 260, as discussed in further detail below. The ReplyTo property can be built-in functionality of the publish-subscribe model such that the ReplyTo destination is understood by rule. For example, the ReplyTo destination can be a determinable location based on message information (e.g., if the Consumer Queue's 130 name is: prepaid-data, ReplyTo destination (Acknowledgment Queue 260) will have -reply in the end: prepaid-data-reply). However, this is merely an example, and the use of an explicit ReplyTo property can provide additional flexibility.

At 425, consumer service 140 consumes the message from publication queue 130. Then, at 435, consumer service 140 forwards the message to subscriber 150 (e.g., an external service). Once subscriber 150 receives the message, at 445, subscriber 150 sends an acknowledgment to consumer service 140. Then, at 455, consumer service 140 forwards the acknowledgment to acknowledgment queue 260. Similar to timing diagram 200, consumer queue 130 does not need to wait for acknowledgements before loading a next message. Rather, once the message is consumed at 425, consumer queue 130 can load a next message at 428, and consumer service 140 can consume the message at 448 before the acknowledgment is even received by acknowledgment queue 260. Thus, even if a plurality of consumer services 140 consume the message from consumer queue 130, consumer queue 130 does not need to wait from acknowledgments from all consumer services 140 before loading a next message. The messages sent in timing diagram 400 may be substantially similar to those sent with regards to timing diagram 200, and will not be duplicated for compactness and ease of understanding.

Although timing diagrams 200-400 are described with various components these are merely examples and, in some cases, functionality of the various components can be combined in one or more components. For example, in implementations, subscriber 150 may consume the message directly from consumer queue 130 (i.e., without using consumer service 140). In such cases, subscriber 150 can acknowledge receipt of the message either through acknowledgment service 270 or directly to acknowledgment queue 260 as desired. Likewise, publisher 110 can act as a message service 120. In such cases, publisher 110 can update the message to include a ReplyTo property and publish the message to consumer queue 130 and acknowledgment queue 260 directly.

Figure 5:
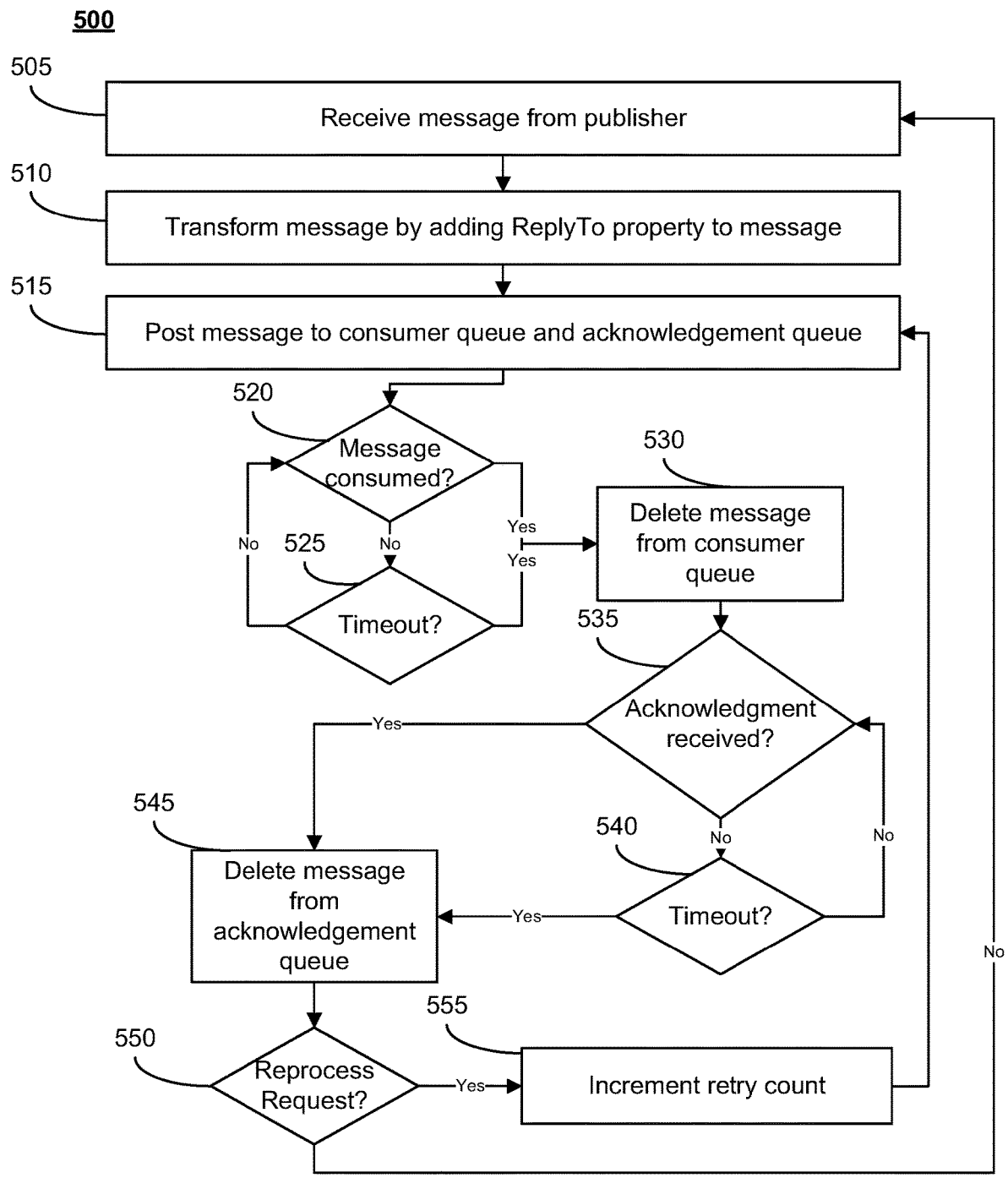
FIG. 5 is a flowchart depicting a method in accordance with aspects of the present disclosure.

FIG. 5 is a flowchart of an example of a method 500 for publishing-subscription messaging. The flowchart illustrates method 500 from the perspective of a publishing server (e.g., one or more physical or logical computer devices implementing the message service 120, consumer queue 130 and/or acknowledgment queue 260), but this is merely an example.

At 505, message service 120 receives a message from publisher 110. The message may be part of a streaming service and contain various identification information and payload data. At 510, message service 120 transforms the message by adding a ReplyTo property to the message. The ReplyTo property designates a recipient of acknowledgments (in this case, acknowledgment queue 260). Then at 515, message service 120 posts the transformed message to consumer queue 130 and acknowledgement queue 260.

When the message is consumed from consumer queue 130 (i.e., at 520—Yes (e.g., at least once for all subscribers)) or a timeout occurs (i.e., at 525—Yes) for the message in consumer queue 130, consumer queue 130 deletes the message at 530. Similarly, when acknowledgment queue 260 receives an acknowledgment (i.e., at 535—Yes (e.g., either from consumer service 140 or acknowledgment service 270)) or a timeout occurs (i.e., at 540—Yes) for the message in acknowledgment queue 260, acknowledgment queue 260 deletes the message at 545. At 550, after deleting the message, if acknowledgment queue 260 receives a reprocess request (i.e., at 550—Yes), a retry counter for the message is incremented and the message is reposted to consumer queue 130 and acknowledgment queue 260. However, this is merely an example. In some cases, if a message is reprocessed more than a certain number of times (e.g., if an additional reprocessing request increases the retry count by 3 or more), the message may be sent to a "dead queue" and the message will no longer be reprocessed or reposted.

Figure 6:
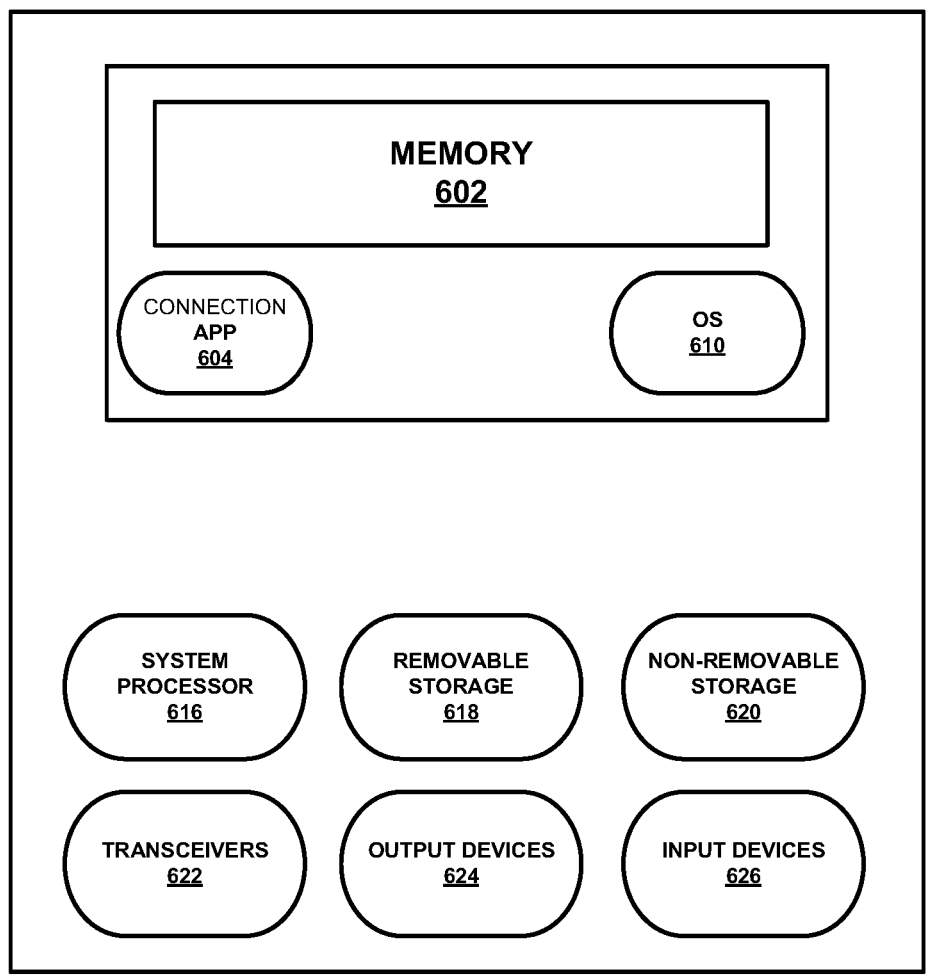
FIG. 6 is an example of a device for use with the systems and methods disclosed herein.

As shown in FIG. 6, the timing diagrams 200-400 and method 500 can also be used in conjunction with a device 600 (e.g., a server, user device, and/or terminal). The device 600 can comprise, for example, a desktop or laptop computer, a server, a bank of servers, or a cloud-based server bank that can implement aspects of one or more of publisher 110, message service 120, consumer queue 130, consumer service 140, subscriber 150, acknowledgement queue 260 and acknowledgement service 270. Thus, while the device 700 is depicted as a single standalone server, other configurations or existing components could be used. In some examples, the device 600 can comprise existing network entities such as, for example, a home location register (HLR), home subscriber service (HSS), a third-generation partnership project authentication, an authorization, and accounting (3GPP AAA) server, or another server or component.

The device 600 can comprise a number of components to execute the above-mentioned functions and apps. As discussed below, the device 600 can comprise memory 602 including many common features such as, for example, the OS 610. In various implementations, the memory 602 can be volatile (such as random access memory (RAM)), non-volatile (such as read-only memory (ROM), flash memory, etc.), or some combination of the two. The memory 602 can include all, or part, of the functions of a connection app 604, among other things.

The memory 602 can also include the OS 610. Of course, the OS 610 can vary depending on the manufacturer of the device 600 and the type of component. Many servers, for example, run Linux or Windows Server. Dedicated cellular routing servers can run a specific telecommunications OS 610. The OS 610 contains the modules and software that supports a computer's basic functions, such as scheduling tasks, executing applications, and controlling peripherals.

A connection app 604 can provide communication between the device 600 and external systems. The device 600 can also comprise one or more system processors 616. In some implementations, the system processor(s) 616 can include a central processing unit (CPU), a graphics processing unit (GPU), or both CPU and GPU, or any other sort of processing unit. The device 600 can also include one or more of removable storage 618, non-removable storage 620, one or more transceiver(s) 622, output device(s) 624, and input device(s) 626.

The device 600 can also include additional data storage devices (removable and/or non-removable) such as, for example, magnetic disks, optical disks, or tape. Such additional storage is illustrated in FIG. 6 by removable storage 618 and non-removable storage 620. The removable storage 618 and non-removable storage 620 can store some, or all, of the OS 610, and connection app 604.

Non-transitory computer-readable media can include volatile and nonvolatile, removable and non-removable tangible, physical media implemented in technology for storage of information, such as computer-readable instructions, data structures, program modules, or other data. The memory 602, removable storage 618, and non-removable storage 620 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information, and which can be accessed by the device 600. Any such non-transitory computer-readable media can be part of the device 600 or can be a separate database, databank, remote server, or cloud-based server.

In some implementations, the transceiver(s) 622 include any sort of transceivers known in the art. In some examples, the transceiver(s) 622 can include a wireless modem to facilitate wireless connectivity with additional servers, the Internet, and/or an intranet via a cellular connection. Further, the transceiver(s) 622 can include a radio transceiver that performs the function of transmitting and receiving radio frequency communications via an antenna (e.g., Wi-Fi or Bluetooth®). In other examples, the transceiver(s) 622 can include wired communication components, such as a wired modem or Ethernet port, for communicating with the other user equipment (UEs) or the provider's Internet-based network.

In some implementations, the output device(s) 624 can include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the device 600 is connected to a network, the type of data being received (e.g., a match vs. a request for service listings), when SIM-OTA messages are being transmitted, etc. Output device(s) 624 can also include ports for one or more peripheral devices, such as headphones, peripheral speakers, or a peripheral display.

In various implementations, input device(s) 626 includes any sort of input devices known in the art. For example, the input device(s) 626 can include a camera, a microphone, a keyboard/keypad, or a touch-sensitive display. A keyboard/keypad can be a standard push-button alphanumeric, multi-key keyboard (such as a conventional QWERTY keyboard), virtual controls on a touchscreen, or one or more other types of keys or buttons, and can also include a joystick, wheel, and/or designated navigation buttons, or the like.

Figure 7:
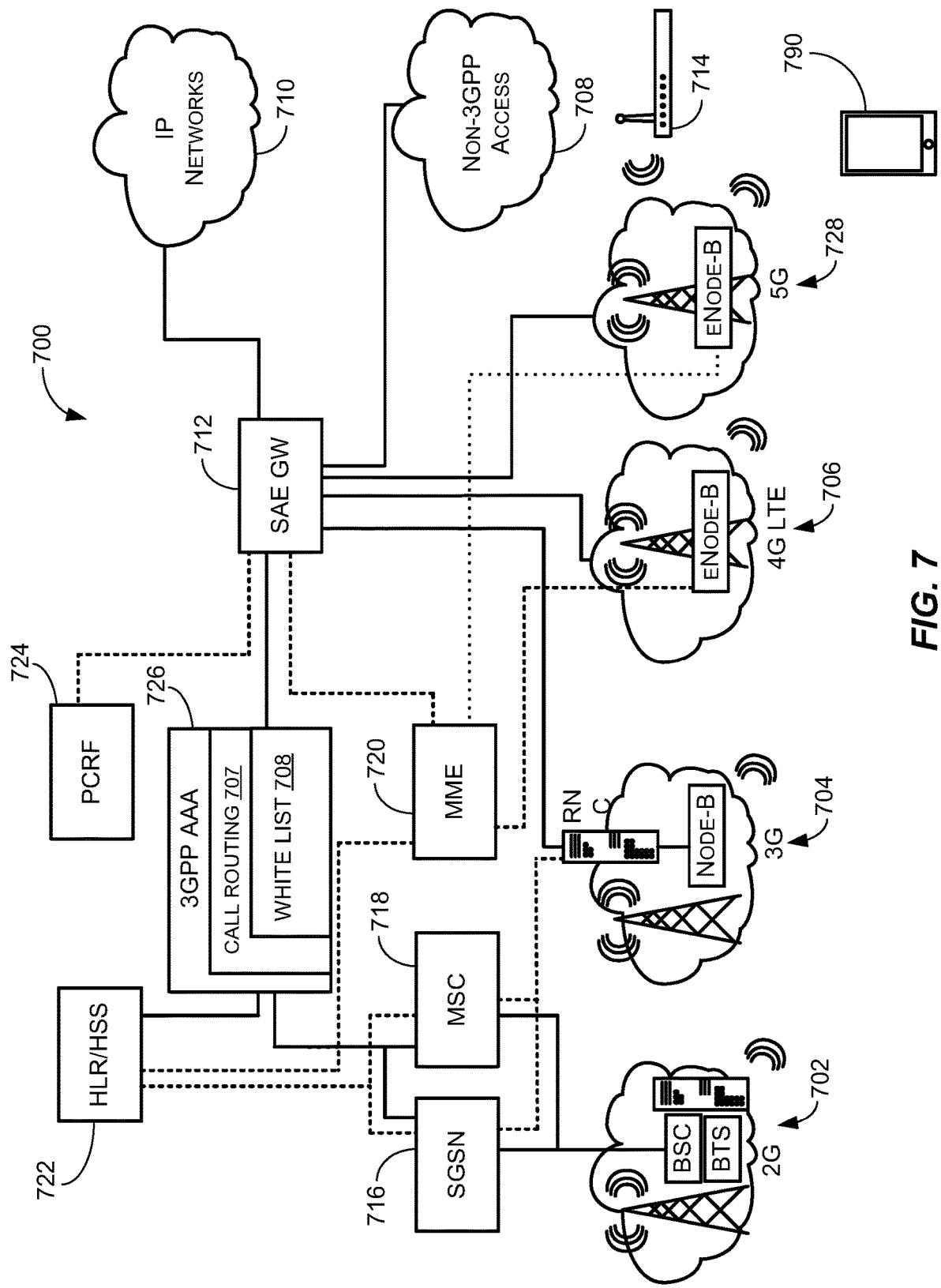
FIG. 7 is an example cellular and internet protocol network for use with some examples of the present disclosure.

FIG. 7 depicts a conventional cellular network 700 including 2G 702, 3G 704, 4G long-term evolution (LTE) 706, and 5G 728 components. Of course, future technologies, such as, for example, 5G and device-to-device (D2D) components could also be included and are contemplated herein. As is known in the art, data may be routed from the Internet or other sources using a circuit switched modem connection (or non-3GPP connection), which provides relatively low data rates, or via IP based packet switched 710 connections, which results is higher bandwidth. LTE system 706, which is purely IP based, essentially "flattens" the architecture, with data going straight from the internet to service architecture evolution gateway (SAE GW) 712 to evolved Node B transceivers 706, enabling higher throughput. UE 790 also has wireless local area network (WLAN) 714 capabilities, in some cases enabling even higher throughput. In some cases, cellular carriers may use WLAN communications in addition to, or instead of, cellular communications to supplement bandwidth.

Serving GPRS support node (SGSN) 716 is a main component of the general packet radio service (GPRS) network, which handles all packet switched data within the network 700 (e.g., the mobility management and authentication of the users). MSC 718 essentially performs the same functions as SGSN 716 for voice traffic. MSC 718 is the primary service delivery node for global system for mobile communication (GSM) and code division multiple access (CDMA), responsible for routing voice calls and short messaging service (SMS) messages, as well as other services (such as conference calls, fax, and circuit switched data). MSC 718 sets up and releases the end-to-end connection, handles mobility and hand-over requirements during the call, and takes care of charging and real-time pre-paid account monitoring.

Similarly, mobility management entity (MME) 720 is the key control-node for 4G LTE network 706 and 5G 728. It is responsible for idle mode UE 790 paging and tagging procedures including retransmissions. MME 720 is involved in the bearer activation/deactivation process and is also responsible for choosing SAE GW 712 for UE 790 at the initial attach and at time of intra-LTE handover involving Core Network (CN) node relocation (i.e., switching from one cell tower to the next when traveling). MME 720 is responsible for authenticating the user (by interacting with the HSS 722 discussed below). The Non-Access Stratum (NAS) signaling terminates at the MME 720 and it is also responsible for generation and allocation of temporary identities to UE 790. The MME 720 also checks the authorization of UE 790 to camp on the service provider's HPLMN or VPLMN and enforces UE 790 roaming restrictions on the VPLMN. MME 720 is the termination point in the network for ciphering/integrity protection for NAS signaling and handles the security key management. MME 720 also provides the control plane function for mobility between LTE 706 and 2G 702/3G 704 access networks with an S3 interface terminating at MME 720 from SGSN 716. MME 720 also terminates an S7a interface towards home HSS 722 for roaming UE 790.

Referring to 5G 728, MME 720 may be configured to respond to an initial attach request by sending a create session request to a network slice selector, also referred to herein as a slice selector and/or a network selector. The create session request may be sent over a logical communication interface that is referred to as an NG4 interface. The NG4 interface typically is used for messaging between the control plane function and the user plane forwarding function of a 5G network. Aspects of the present disclosure may be implemented within containerization of Software Defined Networks (SDN) of 5G nodes, and/or Network Function Virtualization (NfV). As will be understood by one of ordinary skill, SDN decouples traditionally decentralized network control from the physical devices, enabling programmatic control and infrastructure abstraction.

In response to receiving a create session request, the network slice selector may determine which of the available network slices should be used to provide services for UE 790 and may redirect the create session request to the selected network slice. For example, the create session request may be directed to a gateway component of the selected network slice. Specific for a 5G network, the gateway component may comprise a user plane forwarding function.

HSS/HLR 722 is a central database that contains user-related and subscription-related information. The functions of HSS/HLR 722 include functionalities such as mobility management, call and session establishment support, user authentication and access authorization. HSS, which is used for LTE connections, is based on the previous HLR and Authentication Center (AuC) from CGMA and GSM technologies, with each serving substantially the same functions for their respective networks.

The policy and charging rules function (PCRF) 724 is a software node that determines policy rules in network 700. PCRF 724 generally operates at the network core and accesses subscriber databases (e.g., HSS/HLR 722) and other specialized functions, such as enhanced e911 call handling, in a centralized manner. PCRF 724 is the main part of network 700 that aggregates information to and from network 700 and other sources (e.g., IP networks 710). PCRF 724 may support the creation of rules and then may automatically make policy decisions for each subscriber active on network 700. PCRF 724 may also be integrated with different platforms like billing, rating, charging, and subscriber database or may also be deployed as a standalone entity.

Finally, 3GPP AAA server 726 performs authentication, authorization, and accounting (AAA) functions (e.g., call routing 707 and/or white listing 708) and may also act as an AAA proxy server. For WLAN 714 access to (3GPP) IP networks 710 3GPP AAA Server 726 provides authorization, policy enforcement, and routing information to various WLAN components. 3GPP AAA Server 726 may generate and report charging/accounting information, performs offline charging control for WLAN 714, and perform various protocol conversions when necessary.

An embodiment of the present disclosure may be implemented according to at least the following:

Clause 1: A publish-subscribe messaging method including: generating a modified first publication message by modifying a first publication message to include a reply-to property that directs a recipient device to acknowledge, to an acknowledgment queue, receipt of the first publication message; publishing the modified first publication message to (i) the acknowledgment queue and (ii) a consumer queue; responsive to the modified first publication message being consumed by one or more subscribers and/or a first timeout for the modified first publication message expiring, deleting the modified first publication message from the consumer queue; and responsive to the acknowledgment queue receiving an acknowledgment for the modified first publication message and/or a second timeout for the modified first publication message expiring, deleting the modified first publication message from the acknowledgment queue.

Clause 2: The method of Clause 1, wherein the reply-to property directs the recipient device to acknowledge receipt of the first publication message to an acknowledgment service configured to forward an acknowledgment to the acknowledgment queue.

Clause 3: The method of either of Clauses 1 or 2 further including receiving the first publication message from a publisher.

Clause 4: The method of any of Clauses 1-3, wherein deleting the modified first publication message from the consumer queue is in response to the modified first publication message being consumed by a predetermined number of subscribers, the predetermined number of subscribers being a same number as a number of subscribers who have subscribed to the consumer queue.

Clause 5: The method of any of Clause 1-4, wherein deleting the modified first publication message from the consumer queue is performed prior to the acknowledgment queue receiving the acknowledgment for the modified first publication message and prior to the second timeout for the modified first publication message expiring.

Clause 6: The method of any of Clauses 1-5 further including: generating a modified second publication message by modifying a second publication message to include a reply-to property directing a recipient device to acknowledge receipt of the second publication message to the acknowledgment queue; publishing the modified second publication message to (i) the acknowledgment queue and (ii) the consumer queue; and responsive to the modified second publication message being consumed by one or more subscribers, deleting the modified second publication message from the consumer queue, the modified second publication message being consumed prior to the acknowledgment queue receiving the acknowledgment for the modified first publication message.

Clause 7: The method of any of Clauses 1-6 further including: receiving, by the acknowledgment queue and after deleting the modified first publication message from the acknowledgment queue, a reprocessing request for the modified first publication message; incrementing a retry counter for the modified first publication message; and republishing the modified first publication message to (i) the acknowledgment queue and (ii) the consumer queue.

Clause 8: The method of Clause 7 further including: receiving, by the acknowledgment queue, an additional reprocessing request for the modified first publication message; determining that a maximum republication attempt for the modified first publication message has been reached; and disregarding the additional reprocessing request.

Clause 9: The method of either of Clauses 7 or 8 further including: receiving, by the acknowledgment queue, an additional reprocessing request for the modified first publication message; incrementing a retry counter for the modified first publication message; republishing the modified first publication message to (i) the acknowledgment queue and (ii) the consumer queue; and adding the modified first publication message to a dead queue.

Clause 10: A publish-subscribe messaging system including: at least one processor; and at least one memory having stored thereon instructions that, when executed by the at least on processor, instruct the at least one processor to: generate a modified first publication message by modifying a first publication message to include a reply-to property directing a recipient device to acknowledge, to an acknowledgment queue, receipt of the first publication message; publish the modified first publication message to (i) the acknowledgment queue and (ii) a consumer queue; responsive to the modified first publication message being consumed by one or more subscribers, delete the modified first publication message from the consumer queue; and responsive to the acknowledgment queue receiving an acknowledgment for the modified first publication message, delete the modified first publication message from the acknowledgment queue.

Clause 11: The system of Clause 10, wherein the reply-to property directs the recipient device to acknowledge receipt of the first publication message to an acknowledgment service configured to forward an acknowledgment to the acknowledgment queue.

Clause 12: The system of either of Clauses 10 or 11, wherein the instructions, when executed by the at least one processor, further instruct the at least one processor to receive the first publication message from a publisher.

Clause 13: The system of any of Clauses 10-12, wherein the instructions, when executed by the at least one processor, instruct the at least one processor to delete the modified first publication message from the consumer queue in response to the modified first publication message being consumed by a predetermined number of subscribers, the predetermined number of subscribers being a same number as a number of subscribers who have subscribed to the consumer queue.

Clause 14: The system of any of Clauses 10-13, wherein the instructions, when executed by the at least one processor, instruct the at least one processor to delete the modified first publication message from the consumer queue prior to the acknowledgment queue receiving the acknowledgment for the modified first publication message.

Clause 15: The system of any of Clauses 10-14, wherein the instructions, when executed by the at least one processor, further instruct the at least one processor to: generating a modified second publication message by modifying a second publication message to include a reply-to property directing a recipient device to acknowledge receipt of the second publication message to the acknowledgment queue; publish the modified second publication message to (i) the acknowledgment queue and the (ii) consumer queue; and responsive to the modified second publication message being consumed by one or more subscribers, delete the modified second publication message from the consumer queue, the modified second publication message being consumed prior to the acknowledgment queue receiving the acknowledgment for the modified first publication message.

Clause 16: The system of any of Clauses 10-15, wherein the instructions, when executed by the at least one processor, further instruct the at least one processor to: receive, by the acknowledgment queue and after deleting the modified first publication message from the acknowledgment queue, a reprocessing request for the modified first publication message; increment a retry counter for the modified first publication message; and republish the modified first publication message to (i) the acknowledgment queue and (ii) the consumer queue.

Clause 17: The system of Clause 16, wherein the instructions, when executed by the at least one processor, further instruct the at least one processor to: receive, by the acknowledgment queue, an additional reprocessing request for the modified first publication message; determine that a maximum republication attempt for the modified first publication message has been reached; and disregard the additional reprocessing request.

Clause 18: The system of either of Clauses 16 or 17, wherein the instructions, when executed by the at least one processor, further instruct the at least one processor to: receive, by the acknowledgment queue, an additional reprocessing request for the modified first publication message; increment a retry counter for the modified first publication message; republish the modified first publication message to (i) the acknowledgment queue and (ii) the consumer queue; and add the modified first publication message to a dead queue.

Clause 19: The system of any of Clauses 10-18, wherein the instructions, when executed by the at least one processor, further instruct the at least one processor to: delete the modified first publication message from the consumer queue in response a first timeout for the modified first publication message expiring; and delete the modified first publication message from the acknowledgment queue in response to a second timeout for the modified first publication message expiring.

Clause 20: An asynchronous messaging system providing guaranteed exactly-once message delivery, the asynchronous messaging system including: a message subscriber; a message publisher configured to generate a first publication message for the message subscriber; a consumer queue configured to (i) receive the first publication message from the message publisher for consumption by the message subscriber and (ii) delete the first publication message from the consumer queue in response to the first publication message being consumed by the message subscriber; and an acknowledgment queue configured to receive the first publication message from the message publisher and delete the first publication message from the acknowledgment queue in response to the acknowledgment queue receiving an acknowledgment from the message subscriber that it has received the first publication message from the consumer queue.

The specific configurations, machines, and the size and shape of various elements can be varied according to particular design specifications or constraints according to the principles of this disclosure. Such changes are intended to be embraced within the scope of this disclosure. The presently disclosed examples, therefore, are considered in all respects to be illustrative and not restrictive. The scope of the disclosure is indicated by the appended claims, and all changes that come within the meaning and range of equivalents thereof are intended to be embraced therein.

What is claimed is:

1. A publish-subscribe messaging method comprising:
generating a modified first publication message by modifying a first publication message to include a reply-to property that directs a recipient device to acknowledge, to an acknowledgment queue, receipt of the first publication message;
publishing the modified first publication message to (i) the acknowledgment queue and (ii) a consumer queue;
responsive to the modified first publication message being consumed by one or more subscribers and/or a first timeout for the modified first publication message expiring, deleting the modified first publication message from the consumer queue; and
responsive to the acknowledgment queue receiving an acknowledgment for the modified first publication message and/or a second timeout for the modified first publication message expiring, deleting the modified first publication message from the acknowledgment queue.

2. The method of claim 1, wherein the reply-to property directs the recipient device to acknowledge receipt of the first publication message to an acknowledgment service configured to forward an acknowledgment to the acknowledgment queue.

3. The method of claim 1 further comprising receiving the first publication message from a publisher.

4. The method of claim 1, wherein deleting the modified first publication message from the consumer queue is in response to the modified first publication message being consumed by a predetermined number of subscribers, the predetermined number of subscribers being a same number as a number of subscribers who have subscribed to the consumer queue.

5. The method of claim 1, wherein deleting the modified first publication message from the consumer queue is performed prior to the acknowledgment queue receiving the acknowledgment for the modified first publication message and prior to the second timeout for the modified first publication message expiring.

6. The method of claim 1 further comprising:
generating a modified second publication message by modifying a second publication message to include a reply-to property directing a recipient device to acknowledge receipt of the second publication message to the acknowledgment queue;
publishing the modified second publication message to (i) the acknowledgment queue and (ii) the consumer queue; and
responsive to the modified second publication message being consumed by one or more subscribers, deleting the modified second publication message from the consumer queue, the modified second publication message being consumed prior to the acknowledgment queue receiving the acknowledgment for the modified first publication message.

7. The method of claim 1 further comprising:
receiving, by the acknowledgment queue and after deleting the modified first publication message from the acknowledgment queue, a reprocessing request for the modified first publication message;
incrementing a retry counter for the modified first publication message; and
republishing the modified first publication message to (i) the acknowledgment queue and (ii) the consumer queue.

8. The method of claim 7 further comprising:
receiving, by the acknowledgment queue, an additional reprocessing request for the modified first publication message;
determining that a maximum republication attempt for the modified first publication message has been reached; and
disregarding the additional reprocessing request.

9. The method of claim 7 further comprising:
receiving, by the acknowledgment queue, an additional reprocessing request for the modified first publication message;
incrementing a retry counter for the modified first publication message;
republishing the modified first publication message to (i) the acknowledgment queue and (ii) the consumer queue; and
adding the modified first publication message to a dead queue.

10. A publish-subscribe messaging system comprising:
at least one processor; and
at least one memory having stored thereon instructions that, when executed by the at least on processor, instruct the at least one processor to:
generate a modified first publication message by modifying a first publication message to include a reply-to property directing a recipient device to acknowledge, to an acknowledgment queue, receipt of the first publication message;
publish the modified first publication message to (i) the acknowledgment queue and (ii) a consumer queue;
responsive to the modified first publication message being consumed by one or more subscribers, delete the modified first publication message from the consumer queue; and
responsive to the acknowledgment queue receiving an acknowledgment for the modified first publication message, delete the modified first publication message from the acknowledgment queue.

11. The system of claim 10, wherein the reply-to property directs the recipient device to acknowledge receipt of the first publication message to an acknowledgment service configured to forward an acknowledgment to the acknowledgment queue.

12. The system of claim 10, wherein the instructions, when executed by the at least one processor, further instruct the at least one processor to receive the first publication message from a publisher.

13. The system of claim 10, wherein the instructions, when executed by the at least one processor, instruct the at least one processor to delete the modified first publication message from the consumer queue in response to the modified first publication message being consumed by a predetermined number of subscribers, the predetermined number of subscribers being a same number as a number of subscribers who have subscribed to the consumer queue.

14. The system of claim 10, wherein the instructions, when executed by the at least one processor, instruct the at least one processor to delete the modified first publication message from the consumer queue prior to the acknowledgment queue receiving the acknowledgment for the modified first publication message.

15. The system of claim 10, wherein the instructions, when executed by the at least one processor, further instruct the at least one processor to:
generating a modified second publication message by modifying a second publication message to include a reply-to property directing a recipient device to acknowledge receipt of the second publication message to the acknowledgment queue;
publish the modified second publication message to (i) the acknowledgment queue and the (ii) consumer queue; and
responsive to the modified second publication message being consumed by one or more subscribers, delete the modified second publication message from the consumer queue, the modified second publication message being consumed prior to the acknowledgment queue receiving the acknowledgment for the modified first publication message.

16. The system of claim 10, wherein the instructions, when executed by the at least one processor, further instruct the at least one processor to:
receive, by the acknowledgment queue and after deleting the modified first publication message from the acknowledgment queue, a reprocessing request for the modified first publication message;
increment a retry counter for the modified first publication message; and
republish the modified first publication message to (i) the acknowledgment queue and (ii) the consumer queue.

17. The system of claim 16, wherein the instructions, when executed by the at least one processor, further instruct the at least one processor to:
receive, by the acknowledgment queue, an additional reprocessing request for the modified first publication message;
determine that a maximum republication attempt for the modified first publication message has been reached; and
disregard the additional reprocessing request.

18. The system of claim 16, wherein the instructions, when executed by the at least one processor, further instruct the at least one processor to:
receive, by the acknowledgment queue, an additional reprocessing request for the modified first publication message;
increment a retry counter for the modified first publication message;
republish the modified first publication message to (i) the acknowledgment queue and (ii) the consumer queue; and
add the modified first publication message to a dead queue.

19. The system of claim 10, wherein the instructions, when executed by the at least one processor, further instruct the at least one processor to:
delete the modified first publication message from the consumer queue in response a first timeout for the modified first publication message expiring; and
delete the modified first publication message from the acknowledgment queue in response to a second timeout for the modified first publication message expiring.

20. An asynchronous messaging system providing guaranteed exactly-once message delivery, the asynchronous messaging system comprising:
a message subscriber;
a message publisher configured to generate a first publication message for the message subscriber;
a consumer queue configured to (i) receive the first publication message from the message publisher for consumption by the message subscriber and (ii) delete the first publication message from the consumer queue in response to the first publication message being consumed by the message subscriber; and
an acknowledgment queue configured to receive the first publication message from the message publisher and delete the first publication message from the acknowledgment queue in response to the acknowledgment queue receiving an acknowledgment from the message subscriber that it has received the first publication message from the consumer queue.

* * * * *